US007788363B2

(12) United States Patent
Sievert

(10) Patent No.: US 7,788,363 B2
(45) Date of Patent: Aug. 31, 2010

(54) SECURE COMMUNICATION OVER VIRTUAL IPMB OF A MAINFRAME COMPUTING SYSTEM

(75) Inventor: James A. Sievert, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 244 days.

(21) Appl. No.: 12/218,414

(22) Filed: Jul. 15, 2008

(65) Prior Publication Data

US 2010/0017873 A1    Jan. 21, 2010

(51) Int. Cl.
*G06F 15/173* (2006.01)
(52) U.S. Cl. ............... 709/223; 709/220; 709/230; 709/250
(58) Field of Classification Search ........ 709/220, 709/223, 230, 250; 370/255, 389, 428
See application file for complete search history.

(56) References Cited

U.S. PATENT DOCUMENTS

| 7,165,189 | B1* | 1/2007 | Lakkapragada et al. | ..... 709/220 |
| 2003/0152074 | A1* | 8/2003 | Hawkins et al. | ............ 370/389 |
| 2004/0260841 | A1* | 12/2004 | Mathew et al. | ............. 709/223 |
| 2006/0074850 | A1* | 4/2006 | Bouchet | ....................... 707/1 |
| 2009/0073896 | A1* | 3/2009 | Gillingham et al. | ......... 370/255 |

OTHER PUBLICATIONS

Feng et al.,"High Performance Computing Clusters with IPMI", Oct. 2004, Dell Power Solutions, pp. 58-63.*
Intel, "What is IPMI?", Access Date Apr. 30, 2010.*

* cited by examiner

*Primary Examiner*—Ramy M Osman
(74) *Attorney, Agent, or Firm*—Robert P. Marley; Charles A. Johnson

(57) ABSTRACT

In general, techniques for secure communicating over a virtual IPMB of a mainframe computing system are described herein. More specifically, the mainframe computing system comprises a plurality of independent computing cells communicatively coupled together by a network interconnect and that form a plurality of partitions. Each partition is a logical association of one or more of the cells to define a single execution environment. Each cell further executes a virtual intelligent platform management interface (IPMI) protocol to define and configure a respective logical intelligent platform management bus (IPMB) for each of the partitions. Each of the IPMBs logically interconnects with each of the other cells included within the same partition, and each is defined for communication of IMPI messages over the network interconnect. The cells securely communicate the IPMI messages between each of the one or more other cells of each partition via the respective logical IPMB of each partition.

16 Claims, 10 Drawing Sheets

SECURE COMMUNICATION OVER VIRTUAL IPMB OF A MAINFRAME COMPUTING SYSTEM

The entire contents of co-pending application Ser. No. 12/218,382, filed Jul. 15, 2008, entitled "Decentralized Hardware Partitioning within a Multiprocessing Computing System," by named inventors J. Sievert et al., are hereby incorporated by reference as if fully set forth herein.

TECHNICAL FIELD

The invention relates to computing systems and, more particularly, to communicating within a mainframe computing system.

BACKGROUND

Many computing systems implement the Intelligent Platform Management Interface (IPMI) specification. In general, IMPI defines a set of common interfaces to computer hardware and firmware which system administrators can use to monitor system health and manage the system. IPMI allows administrators to manage a system remotely. System administrators can then use IPMI messaging to query platform status, to review hardware logs, or to issue other requests from a remote console through the same connections. The latest version of the IPMI specification is IPMI version 2.0 published Feb. 12, 2004.

Traditionally, computing systems implement IPMI using a management controller called the Baseboard Management Controller (BMC) and zero or more slave controllers located within the chassis of the computing system. The controllers are typically interconnected via a dedicated inter-chip physical interface called the IPMB (Intelligent Platform Management Bus/Bridge). The controllers communicate health and management information over the IPMB using dedicated IPMI messages. The IPMB is an enhanced implementation of an Inter-Integrated Chip ($I^2C$) bus, which was developed by Philips Electronics.

As per the IPMB specification, the various controllers on the dedicated IPMB are assigned respective 8-bit IPMI slave addresses. Communications between the controllers over the IPMB occur in a broadcast nature, meaning all controllers receive each others' IPMI messages but only respond to those messages addressed to their assigned IPMI address.

While widely accepted, IPMI is often difficult to implement in complex multiprocessing computing environments, such as mainframe computers. Mainframe computers, for example, are becoming increasingly more complex and include large numbers of interconnected processors and resources (e.g., memory units) that may be dynamically configured into different processing partitions. More specifically, today's mainframe computers typically consist of a plurality of independent multi-processing units typically referred to as a "cell." The cell represents the basic mainframe building block. That is, an administrator is able to logically associate two or more cells to define a single execution environment, i.e., a "partition," on which an instance of an operating system and one or more software applications can be executed. Typically, the administrator of the mainframe computer defines a plurality of different partitions, each executing a different instance of an operating system and various software applications so as to provide a comprehensive computing environment.

In such computing environments it is often a challenge to implement IPMI. For example, the dynamic partitioning of mainframe computers is generally not compatible with the dedicated IPMB inter-chip interface used by conventional IPMI systems. Further, due to its broadcast nature, the IPMB offers little security other than distinct IPMI addresses to prevent cells of one partition from processing IMPB messages directed between cells of another partition, thereby reducing the logical isolation between partitions that is desired by most administrators of mainframe computers.

SUMMARY

In general, one embodiment is described in which a mainframe computing system supports a virtual Intelligent Platform Management Interface (IPMI) protocol for communicating IPMI messages between cells of a partition. More specifically, the mainframe computing system comprises a plurality of independent computing cells that each support the sending and receiving of IPMI messages over an Ethernet network interconnecting the cells. The virtual IPMI protocol executing on each cell allows the cell to send the IPMI messages over the Ethernet interconnect and thereby forgo the requirement of a dedicated $I^2C$ bus. Further, the cells may be logically configured into different partitions, and each partition may configure a plurality of secure logical or virtual IPMBs over the same physical Ethernet interconnect, thereby ensuring a further measure of isolation between partitions.

As an example, a first cell of the mainframe computing system forms an Ethernet message that directly encapsulates an IPMI message in accordance with the virtual IPMI protocol executing on the cell. That is, the Ethernet message "directly" encapsulates the IPMI message because the IPMI message is not first encapsulated within another protocol message, such as a TCP/IP message, but is directly encapsulated by the Ethernet message in its original IPMI message format. Once formed, the first cell may transmit this Ethernet message to a second cell of the mainframe computing system that is logically associated with the partition as the first cell. Upon receiving the Ethernet message, the second cell may, according to the virtual IPMI protocol, extract the IPMI message directly encapsulated in the Ethernet message, and utilize IPMI software applications to decode and process the IPMI message. In this way, the virtual IPMI protocol provides a level of abstraction over the Ethernet interconnect that allows each cell to leverage existing maintenance software applications that utilize IPMI.

The techniques provide a measure of logical isolation for IPMI communications associated with the different partitions of the mainframe computing system. The cells of a given partition configure a logical IPMB (i.e., a virtual inter-chip bus) in accordance with the virtual IPMI protocol so that IPMI messages are exchanged only between cells of the same logical partition even though all IPMI message are communicated over the same physical Ethernet interconnect. The addresses of the cells for each logical IPMB may comprise a cell identifier that uniquely identifies the cell within the mainframe computing system. A bus number is used to identify each of the logical IPMBs that have been defined, and the bus number may include a partition identifier that uniquely identifies the partition within the mainframe computing system with which the logical IPMB is associated. Using the cell addresses and IPMB bus number, the cells of each of the plurality of partitions securely communicate IPMI messages between each other over their respective logical IPMB. Because the IPMBs are merely logical busses, all of the logical IPMBs operate over the same physical Ethernet interconnect that couples each of the plurality of cells of the mainframe computing environment. By configuring separate logical IPMBs for each partition to resource association in accordance with the virtual IPMI protocol, a further measure of isolation and therefore security is provided between partitions.

In one embodiment, a method of communicating intelligent platform management interface data within a mainframe computing system comprises forming a plurality of partitions within the mainframe computing system, wherein each partition is a logical association of one or more of a plurality of independent computing cells of the mainframe computing system to define a single execution environment that includes the one or more logically associated cells, the independent computing cells communicatively coupled together by a network interconnect. The method further comprises executing a virtual intelligent platform management interface (IPMI) protocol to define and configure a respective logical intelligent platform management bus (IPMB) for each of the partitions, each of the IPMB to logically interconnect each of the one or more plurality of cells included within the same one of the plurality of partitions, each of the logical IPMB defined for communication of IMPI messages over the network interconnect. The method also comprises securely communicating the IPMI messages between each of the one or more cells of each partition via the respective logical IPMB of each partition.

In another embodiment, a mainframe computing system that communicates intelligent platform management interface (IPMI) data comprises a network interconnect and a plurality of independent computing cells communicatively coupled together by the network interconnect, and that form a plurality of partitions, wherein each partition is a logical association of one or more of the plurality of cells to define a single execution environment that includes the one or more logically associated cells. Each cell of the system further executes a virtual intelligent platform management interface (IPMI) protocol to define and configure a respective logical intelligent platform management bus (IPMB) for each of the partitions, each of the IPMBs to logically interconnect each of the one or more plurality of cells included within the same one of the plurality of partitions, each of the logical IPMBs defined for communication of IMPI messages over the network interconnect. The cells also securely communicate the IPMI messages between each of the one or more other cells of each partition via the respective logical IPMB of each partition.

In another embodiment, a mainframe computer system comprises a communication means for communicating data and a plurality of independent computing means for forming a plurality of partitions, wherein each partition is a logical association of one or more of the plurality of cells to define a single execution environment that includes the one or more logically associated cells, wherein each of the computing means are communicatively coupled together by the communication means. Each of the computing means is further for executing a virtual intelligent platform management interface (IPMI) protocol to define and configure a respective logical intelligent platform management bus (IPMB) for each of the partitions, each of the IPMBs to logically interconnect each of the one or more plurality of cells included within the same one of the plurality of partitions, each of the logical IPMBs defined for communication of IMPI messages over the network interconnect. The computing means are also for securely communicating the IPMI messages between each of the one or more other cells of each partition via the respective logical IPMB of each partition.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
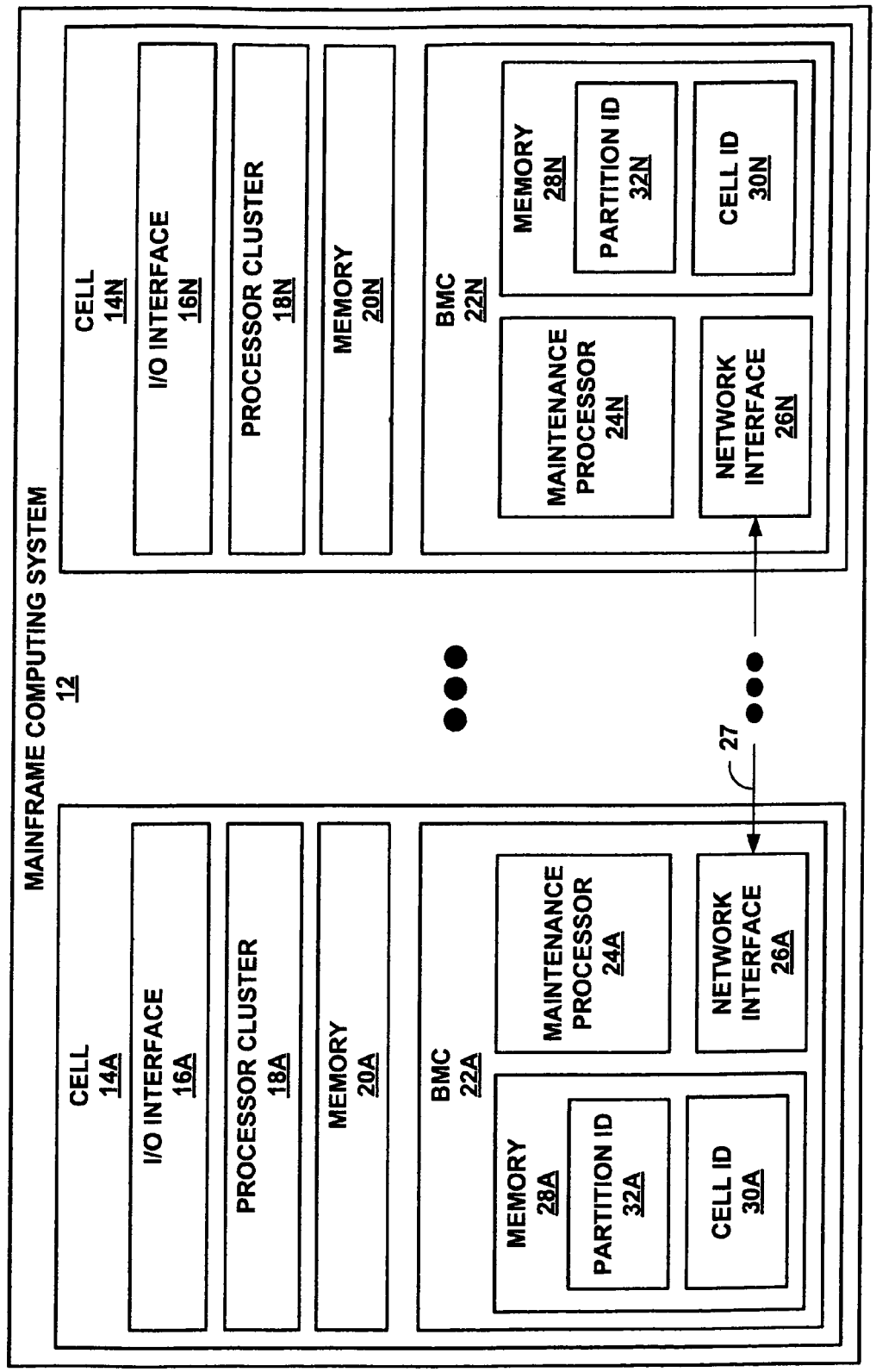
FIG. 1 is a block diagram illustrating an exemplary mainframe computing system that supports inter-cell communication of maintenance and status information in accordance with a virtual Intelligent Platform Management Interface (IPMI) protocol as described herein.

FIG. 1 is a block diagram illustrating an exemplary mainframe computing system 12 that supports inter-cell communication of maintenance and status information in accordance with a virtual Intelligent Platform Management Interface (IPMI) protocol as described herein. As shown in FIG. 1, mainframe computing system 12 comprises cells 14A-14N ("cells 14") that each represents a functional block of mainframe computing system 12. Cells 14 may be substantially similar to one another and may comprise substantially similar components. For example, each of cells 14 include respective input/output interfaces 16A-16N ("I/O interfaces 16" in FIG. 1), processor clusters 18A-18N ("processor clusters 18"), memories 20A-20N ("memories 20"), and baseboard management controllers 22A-22N ("BMCs 22" in FIG. 1) and these components may act in a substantially similar manner. Thus, each of cells 14 functions so as to provide its own computing environment, independent of other cells 14, but cells 14 may also interconnect to provide mainframe computing system 12 with more computing power and memory storage space.

Throughout the below disclosure, use of A-N, such as cells 14A-14N, or any other alphabetic range, such as N-Z, is not intended to indicate a particular number of elements, modules or any other component, but is representative of a variable number of each respective element, module, or component.

Logical execution environments, referred to as "partitions" can be defined using groups of one or more of cells 14 of mainframe systems 12. For example, multiple cells 14 can be logically associated to combine computing power and memory storage space to form a single execution environment (i.e., partition) on which an instance of an operating system and a group of software application can execute. In this way, a partition is typically the next highest building block above a cell in a mainframe computing environment, such as mainframe computing system 12. A partition, however, does not require two or more of cells 14 and may be formed upon a single one of cells 14 that is configured to operate independently from other cells 14. That is, a partition, as it is referred to herein, may be formed upon a single one of cells 14 operating independently of the other cells 14 or two or more of cells 14 that are logically associated to combine resources and computing power.

Cells 14 communicate with external devices via respective I/O interfaces 16. That is, I/O interfaces 16 of cells 14 enable communication with other I/O devices, such as disk storage units, tape drives, or other devices or external networks (e.g., local area networks), as well as, other cells 14. I/O interfaces 16 may each provide the physical interface to other devices and/or networks over which information may be conveyed.

Each of cells 14 further includes a respective one of processor clusters 18 that communicate with other cells 14 via I/O interfaces 16. Processor clusters 18 may include any number of processors coupled together in a cluster formation so as to concurrently execute operations. When multiple cells 14 are logically associated as part of the same partition, processor clusters 18 of each of the cells may provide resources for execution of a single instance of an operating system (not shown in FIG. 1).

BMCs 22 generally manage the interface between system management software and platform hardware. For example, BMCs 22 may receive reports from sensors (not shown in FIG. 1) located throughout their respective cells 14. The reports may concern cell parameters, such as temperature, cooling fan speed, power mode, and operating system status. BMCs 22 may monitor their respective sensors and send alerts of a potential cell failure to an administrator if, for example, any of the parameters do not stay within preset limits. BMCs 22 may also record these alerts in a log file for later examination by the administrator.

As shown in FIG. 1, each of BMCs include respective maintenance processors 24A-24N ("maintenance processors 24") that may perform the above described sensor monitoring, network interfaces 26A-26N ("network interfaces 26") that each provides an Ethernet interface to an Ethernet interconnect 27 that couples to all of the BMCs 22, and memories 28A-28N ("memories 28") that may store these reports and alerts locally (not shown in FIG. 1). Both memories 20 and 28 may comprise any volatile memory such as random access memory (RAM), dynamic RAM (DRAM), static RAM (SRAM), or non-volatile memory such as a magnetic data storage device or optical data storage device.

While the above generally describes the physical interconnect of BMCs 22, BMCs 22 further perform functions specific to communicating with other BMCs 22 via the virtual IPMI protocol as described herein. In particular, each of BMCs 22 may be assigned a cell identifier 30A-30N ("cell IDs 30") and, based on their respective cell IDs 30 and other administrator-supplied configuration information (not shown in FIG. 1), compute a respective partition identifier 32A-32N ("partition IDs 32"), both of which may be stored to memories 28, as shown in FIG. 1. Cell IDs 30 uniquely identify cells 14 to which they are assigned within mainframe computing system 12. Partition IDs 32 uniquely identify partitions within mainframe computing system 12. The process by which cells 14 individually perform the partitioning process is referred to herein as "decentralized hardware partitioning." A detailed description of exemplary decentralized hardware partitioning techniques is provided in the above incorporated co-pending application entitled "Decentralized Hardware Partitioning within a Multiprocessing Computing System," by named inventors J. Sievert et al.

Based upon computed partition IDs 32, BMCs 22 form a plurality of partitions within mainframe computing system 12. Each of cells 14 typically belongs to a single partition. BMCs 22 further execute a virtual IPMI protocol to configure a logical IPMB over Ethernet interconnect 27 for each of the plurality of partitions. The addresses of the cells on each logical IPMB may be based at least in part on cell IDs 30. The bus number identifying each of the logical IPMBs may be based at least in part on a partition identifier that uniquely identifies the partition within the mainframe computing system. The cells of each of the plurality of partitions securely communicate IPMI messages between each other over their respective logical IPMB. Because the IPMBs are logical inter-chip busses, all of the logical IPMBs ultimately communicate over the same physical Ethernet interconnect 27 that couples to each of cells 14. By configuring separate logical IPMBs for each partition in accordance with the virtual IPMI protocol, a further measure of isolation and therefore security is provided between partitions when compared to conventional IPMI techniques.

As an example, one of BMCs 22 may form an Ethernet message that directly encapsulates an intelligent platform management interface (IPMI) message within the Ethernet message without encapsulating the IPMI message within any other protocol message according to the virtual IPMI protocol. That is, the Ethernet message "directly" encapsulates the IPMI message because the IPMI message is not first encapsulated within another protocol message, such as a TCP/IP message, but is directly encapsulated by Ethernet message in its original IPMI message format. To further clarify, low level (i.e., Layer 2 of the OSI model) Ethernet messages encapsulate the IPMI messages "as is" over Ethernet interconnect 27.

The encapsulation is performed according to typical Ethernet protocol techniques in that the IPMI message, when encapsulated, represents a payload of an Ethernet message, e.g., an Ethernet frame or packet. Typical Ethernet headers may then precede the payload containing the IPMI message in its original format. These headers may contain a destination and source MAC address and other information necessary to deliver the Ethernet message to its intended destination. In some instances, one or more Ethernet message may be required to encapsulate a single IPMI message, and in these instances, the IPMI message may be segmented into a plurality of portions, where each portion is encapsulated within a payload of an Ethernet message. While segmented into portions, the IPMI message may still maintain its original formatting in that none of data corresponding to the IPMI message is removed, added, or otherwise altered.

BMC 22 then transmits the Ethernet messages to at least one other BMC 22 that are logically connected to the same virtual IPMI bus. In this way, BMCs 22 may transmit IPMI messages encapsulated within Ethernet messages over their respective logical IPMB to other BMCs 22 of the same partition. The other BMC 22 receives the Ethernet messages and, according to the virtual IPMI protocol, extracts the IPMI message directly encapsulated in the Ethernet messages. The other BMC 22 may then, use any IPMI software application to decode the stream of IPMI messages, thereby leveraging any pre-configured support of IPMI despite not being coupled to other BMCs 22 via a requisite I²C bus. In this manner, the BMCs may transparently send IPMI messages over an Ethernet interconnect and thus leverage any application-level IPMI support. Moreover, intra-partition IPMI communications are made more secure in that inter-partition IPMI communication is prevented even though a common Ethernet interconnect is used.

Although described with respect to mainframe computing system 12 having a plurality of independent computing cells 14, the techniques may be applied to other mainframe systems having independent execution units coupled by a network interconnect.

Figure 2:
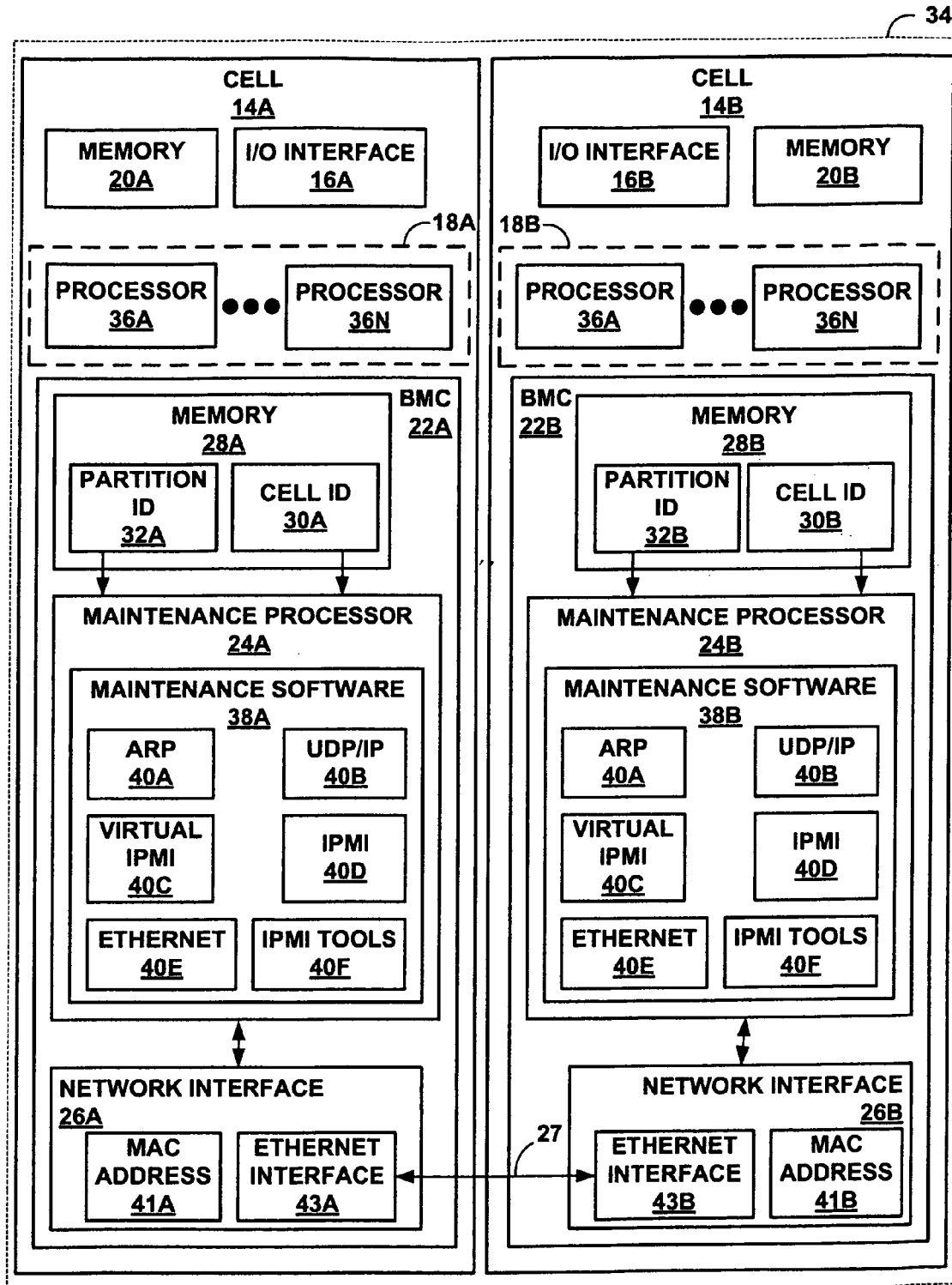
FIG. 2 is a block diagram illustrating an exemplary partition formed within the mainframe computing system of FIG. 1 in which intra-partition IPMI messages are communicated according to the virtual IPMI protocol described herein.

FIG. 2 is a block diagram illustrating an exemplary partition 34 formed within mainframe computing system 12 of FIG. 1 in which intra-partition IPMI messages are communicated according to the virtual IPMI protocol described herein. In this example, partition 34 is formed by the association of a first cell 14A and a second cell 14B. Although shown as including two cells 14A, 14B in FIG. 2, partition 34 may include any number of cells 14 including only a single one of cells 14. Moreover, cells 14 represent one example of a computing means for performing the techniques described herein; however, many other examples exist and the invention should not be limited strictly to mainframe computing systems.

As shown in FIG. 2, cells 14A, 14B may be substantially similar in that both contain substantially the same components. For example, cells 14A, 14B include the above described I/O interfaces 16A, 16B, processor clusters 18A, 18B, memories 20A, 20B, and BMCs 22A, 22B. Processor clusters 18A, 18B each include processors 36A-36N ("processors 36"). Although from FIG. 2 it could be implied that each of cells 14 maintain the same number of processors 36 within each of processor clusters 18, the techniques, as described herein, do not require this particular processor configuration. Instead, each of processor clusters 18 may include any number of processors 36, and the techniques should not be limited to the example embodiment shown in FIG. 2.

As further shown in FIG. 2, maintenance processors 24A, 24B execute respective maintenance software 38A, 38B ("maintenance software 38"). Maintenance software 38 may perform many of the virtual IPMI protocol techniques described herein. For example, maintenance software 38 may comprise instructions stored to a computer-readable medium, such as one of memories 28. A processor, such as one of maintenance processors 24, may execute maintenance software 38B to cause the processor, e.g., one or more of maintenance processors 24, to perform the virtual IPMI protocol techniques described herein. Network interfaces 26, as described above, facilitate the communication between cells 14 generally and BMCs 22 in particular via Ethernet interconnect 27. Network interfaces 26 each include a respective MAC address 41A, 41B ("MAC addresses 41"), which is statically assigned to each network interface 26 so that it can be uniquely identified within a network, and Ethernet interfaces 43A, 43B, each of which provides an interface to Ethernet interconnect 27.

Each of maintenance software 38 includes a number of modules 40A-40F. Address resolution protocol module 40A ("ARP 40A") enables maintenance software 38 to formulate messages by which it can resolve unknown addresses. More information concerning one version of ARP can be found in request for comments (RFC) 826, titled "An Ethernet Address Resolution Protocol—or—Converting Network Protocol Addresses," prepared by the Network Working Group of the Internet Engineering Task Force (IETF), dated November 1982, herein incorporated by reference.

User datagram protocol/Internet protocol module 40B ("UDP/IP 40B") is a protocol similar to that of TCP/IP only UDP/IP 40B does not guarantee delivery of messages and it is not a connection—or, better stated, session-based protocol. Additional information regarding UDP can be found in RFC 768, titled "User Datagram Protocol," prepared by the Network Working Group of the Internet Engineering Task Force (IETF), dated Aug. 28, 1980, herein incorporated by reference. Virtual IPMI protocol module 40C ("Virtual IPMI 40C") is a protocol described herein that facilitates configuring a virtual IPMB for intra-partition IPMI communication by encapsulating IPMI messages directly within an Ethernet messages for transmission over Ethernet interconnect 27.

IPMI protocol module 40D ("IPMI 40D") constructs an "IPMI stack." In other words, IPMI 40D provides a protocol for understanding, communicating, responding, and packaging IPMI messages in accordance with the IPMI specification. More information concerning the IPMI protocol, IPMI operation and IPMI messages can be found in a document entitled "Intelligent Platform Management Interface Specification Second Generation v2.0," document revision 1.0, published Feb. 12, 2004, having markups dated Feb. 15, 2006 and published by Intel, Hewlett-Packard, NEC and Dell, which is hereby incorporated by reference as if fully set forth herein. In addition, more information concerning an earlier version of the IPMI protocol, its operation and IPMI messages can be found in another document entitled "Intelligent Platform Management Interface Specification v1.5," document revision 1.1, published Feb. 20, 2002, having markups dated Jun. 1, 2004, and published by Intel, Hewlett-Packard, NEC and Dell, which is also hereby incorporated by reference as if fully set forth herein.

Typically, virtual IPMI 40C forwards those IPMI messages it recovers from the virtual IPMB, the Ethernet message, or both. Although shown in FIG. 2 as each comprising a single IPMI 40D, maintenance software 38A may instantiate multiple instances of IPMI 40D, one for each IPMI session corresponding to different virtual IPMBs for different partitions. Ethernet protocol module 40E ("Ethernet 40E") represents a module for constructing Ethernet messages and if these Ethernet messages encapsulate IPMI messages without these IPMI messages being further encapsulated, Ethernet protocol module 40E can be said to "directly" encapsulate the IPMI messages, as described above. Additional information concerning the Ethernet protocol may be found in one of the various Institute of Electrical and Electronics Engineers (IEEE) standards numbered 802.3 prepared by the IEEE 802.3 Ethernet Working Group, each of which are herein incorporated by reference.

IPMI tools module 40F ("IPMI tools 40F") represent a module incorporated into maintenance software 38 with which an administrator may interact to invoke IPMI 40D to construct and receive IPMI messages and therefore collect, manage, and view IPMI data, such as data concerning the above mentioned sensors and cell parameters. For example, IPMI tools 40F may present a user interface (not shown in FIG. 2), such as a command line interface or graphical user interface, with which the administrator may interact to issue commands. In response to the command, IPMI tools 40F may invoke IPMI 40D to formulate an IPMI message to query a sensor or another of BMCs 22 to gather IPMI data. Alternatively, IPMI tools 40F may maintain a database or other data structure (not shown in FIG. 2) within respective memories 28 that stores IPMI data, and in response to the command, query this database to collect the requested IPMI data. IPMI tools 40F may, upon receiving the IPMI data, present the requested IPMI data to the administrator for use in managing mainframe computing system 12.

As described below in more detail, IPMI tools 40F may comprise one or more of local system, partition, and resource maintenance software instances, each of which is dedicated to servicing a separate IPMI stack constructed by a corresponding instance of IPMI 40D. Moreover, each stack may couple or correspond to (e.g., service) a dedicated virtual IPMB over which IPMI messages flow. The software instances may associate sets of users to each virtual IPMB or channel in the IPMI context to enable a layered security approach.

That is, a user may be required to provide authentication information to log into successive levels of mainframe computing system 12, for example. A first layer of authentication may be required at the system-level and a second layer of authentication may be required at the partition-level. This may offer additional security and more accurately emulate IPMI. For example, IPMI tools 40F may require a user to provide a username and password to access the system, which IPMI tools 40F may, upon receiving this authentication information, authenticate by accessing a database or other memory (also not shown in FIG. 2 for ease of illustration purposes). Once authenticated, the user may be required to input additional authentication information, e.g., a separate password, prior to querying specific partitions, as these partitions may be independently managed by different users. Again, IMPI tools 40F may access the database to authenticate the provided authentication information according to conventional authentication protocols and principles.

As described above, an administrator may group cells 14 into different logical partitions and provide individual cell IDs 30 to cells 14. Based on their respective cell IDs 30 as well as partition selection information, maintenance processors 24 may compute respective partition IDs 32 in a decentralized fashion. Based on respective partition IDs 32, maintenance processors 24 may configure the respective cells at boot time to enable the selected partitions, such as partition 34. Either prior to or post formation of partition 34, maintenance processors 24A, 24B or, more particularly, maintenance software 38A, 38B executing within respective maintenance processors 24A, 24B, may configure a logical IPMB over Ethernet interconnect 27. After configuring the logical IPMB for partition 34, maintenance software 38B, for example, may securely communicate IPMI messages to maintenance software 38A over the logical IPMB for partition 34. Maintenance software 38B may communicate these IPMI messages due to an administrator query specified via IPMI tools 40F, as discussed above.

In order to communicate the IPMI messages, maintenance software 38B may configure within its virtual IPMI 40C an association between the logical IPMB and partition ID 32B, thereby assigning the newly configured logical IPMB a bus number. Maintenance software 38A may also configure within its virtual IPMB 40C a similar association, as both partition IDs 30A, 30B equal the same number, or better stated, identify the same partition, i.e., partition 34, in this instance. IPMI 40D of maintenance software 38B may form each IPMI message in conventional fashion in accordance with the IPMI protocol, which virtual IPMI 40C intercepts before the IPMI messages reach network interface 26B.

Virtual IPMI 40C then causes each of the IPMI messages to be encapsulated in one of two different protocol messages. In one instance, virtual IPMI 40C may forward the IPMI message to UDP/IP 40B, which upon receiving the message encapsulates the IPMI message within a UPD/IP message. Virtual IPMI 40C may maintain a table or some other data structure that associates IPMB addresses with user datagram protocol (UDP) endpoints (e.g., IP address and a port number), and upon intercepting the IPMI address, lookup the appropriate UDP endpoint using the IPMB address as the key. In accordance with the virtual IPMI protocol techniques described herein, the IPMI message may comprise one of cell IDs 30, and for purposes of illustration, indicates cell ID 30A. Thus, using cell ID 30A as a lookup key in accessing its table or other data structure, virtual IPMI 40C may determine the UDP endpoint associated with cell ID 30A and forward this associated UDP endpoint to UDP/IP with the IPMI message to be encapsulated. Upon receiving the message, UDP/IP 40B formulates a UDP/IP message bearing this UDP endpoint and encapsulating the IPMI message.

After UPD/IP 40B has finished formatting the UDP/IP message, virtual IPMI protocol 40C may insert into the UPD/IP message the bus number assigned to the logical IPMB over which the UDP/IP message is to be sent, such that only those cells, i.e., cells 14A, 14B, that belong to the partition identified by partition IDs 32A, 32B, i.e., partition 34, may process the UDP/IP message. Thus, the bus number provides a further measure of security because only those cells 14 that belong to partition 34 can configure the association between the logical IPMB and the bus number, e.g., partition IDs 32A, 32B, within their respective virtual IPMI protocols 40C. All other partition IDs 32, because they uniquely define the partitions within mainframe computing system 12, configure other associations, which prevents other virtual IPMIs 40C from processing those messages having bus numbers, e.g., partition IDs 30, that differ from their respective bus number, e.g., partition IDs 30. After inserting the bus number, virtual IPMI 40C causes network interface 26B to broadcast the UPD/IP message that encapsulates the IPMI message on Ethernet interconnect 27.

Network interface 26A receives the UDP/IP message, whereupon it forwards the message to maintenance software 38A. Maintenance software 38A utilizes virtual IPMI protocol 40C to determine whether the UDP/IP message indicates the proper bus number, e.g., partition ID 30A, for the virtual IPMB associated with the partition to which cell 14A belongs. If not, virtual IPMI protocol 40C disregards the message and may not process, respond, or otherwise react to the UDP/IP message. If, as in this instance, the UPD/IP message indicates the proper bus number, which virtual IPMI 40C checks against its association table, maintenance software 38A utilizes UDP/IP 40B to unpack the encapsulated IPMI message and forwards this IPMI message to IPMI 40D. IPMI 40D may processes the IPMI message and forward the IPMI data to IPMI tools 40F, which may take the appropriate action, present the IPMI data to the administrator, store the IPMI data to a database, issue an alert, or log the IPMI data.

As an alternative to the above UDP/IP encapsulation scheme, virtual IPMI 40C of maintenance software 38B may encapsulate the IPMI message generated by IPMI 40D directly in an Ethernet message. In this instance, maintenance software 38B may utilize virtual IPMI 40C to intercept the IPMI message prior to transmission and determine to which particular cell the IPMI message is addressed. Typically, the IPMB address is the cell number; however, maintenance software 38B may not know the Ethernet address, i.e., MAC address 41, assigned to the particular network interface of the cell. Thus, maintenance software 38B, to properly encapsulate the IPMI message, may be required to discover the MAC address assigned to cell 14A for example, unless maintenance software 38B maintains a pre-programmed data structure associating IPMI addresses to MAC addresses. However, for purposes of illustration, it is assumed that maintenance software 38B does not know the MAC address and therefore must discover the MAC address.

To discover the MAC address assigned to network interface 26A, maintenance software 38B employs ARP 40A to discover the MAC address assigned to network interface 26A of cell 14A to which the IPMI message is destined. First, ARP 40A formulates and sends an ARP message requesting whichever cell 14 that supports the virtual IPMI protocol and is identified by the IPMB address to respond to the ARP message. In this example, cell 14A, upon receiving the ARP message, responds to the ARP message. More particularly, network interface 26A forwards the ARP message to maintenance software 38A, whereupon ARP 40A of maintenance software 38A determines that the ARP message requires support of the virtual IPMI protocol.

If ARP 40A determines that no support exists for the virtual IPMI protocol (e.g., virtual IPMI 40C is not present in maintenance software 38A), ARP 40A disregards the ARP message. However, as is the case in FIG. 2, if ARP 40A determines that support exists for the virtual IPMI protocol (as virtual IPMI 40C is present in maintenance software 38A), ARP 40A forwards the address to virtual IPMI 40C. Virtual IPMI 40C determines whether cell ID 30A, e.g., its IPMI address, matches the cell ID specified in the ARP message. Next, upon successfully verifying that the IPMI addresses match, virtual IPMI 40C of maintenance software 38A utilizes ARP 40A to formulate a response to the ARP message. ARP 40A of maintenance software 38A responds to the ARP message with the response ARP message that includes MAC address 41A assigned to network interface 26A.

Upon receiving the response ARP message, ARP 40A of maintenance software 38B can associate the destination IPMB address to the MAC address received in the ARP response, e.g., MAC address 41A. Virtual IPMI 40C may receive this association and may construct a table or some other data structure and store the association in the data structure, thereby saving time by not having to perform the association request every time maintenance software 38B sends an IPMI message. Alternatively, virtual IPMI 40C may repeatedly require ARP 40A to perform this association procedure so that virtual IPMI 40C always maintains the most up-to-date association between IPMI addresses and MAC addresses 41. In either case, upon configuring the association, virtual IPMI 40C may forward the IPMI message and the destination MAC address, e.g., MAC address 41A, to Ethernet 40E which directly encapsulates the IPMI message within an Ethernet message designating the associated MAC address, e.g., MAC address 41A, as the destination address. Virtual IPMI 40C may again intercept the Ethernet message before it can be forwarded to network interface 26A so that it can insert the appropriate logical IPMB bus number into the Ethernet message.

Again, maintenance software 38B may transmit the Ethernet message directly encapsulating the IPMI message via network interface 26B across Ethernet interconnect 27. Ethernet interconnect 27 conveys the Ethernet message to each of cells 14, however having been addressed to network interface 26A by way of MAC address 41A, only network interface 26A should proceed to processes the Ethernet message. Moreover, only those cells having a partition ID identifying partition 34 may process the Ethernet message, as only those cells 14 will be able to determine the appropriate bus number corresponding to the logical bus for partition 34. For example, maintenance software 38A receives the Ethernet message, whereupon virtual IPMI 40C determines whether the bus number matches partition ID 32A. As described above, in this instance partition ID 32A matches the bus number, and virtual IPMI 40C forwards the Ethernet message to Ethernet 40E which unpacks the IPMI message and forwards the IPMI message to IPMI 40D. IPMI 40D again processes the IPMI message and forward the IPMI data to IPMI tools 40F, which may take the appropriate action.

Figure 3A:
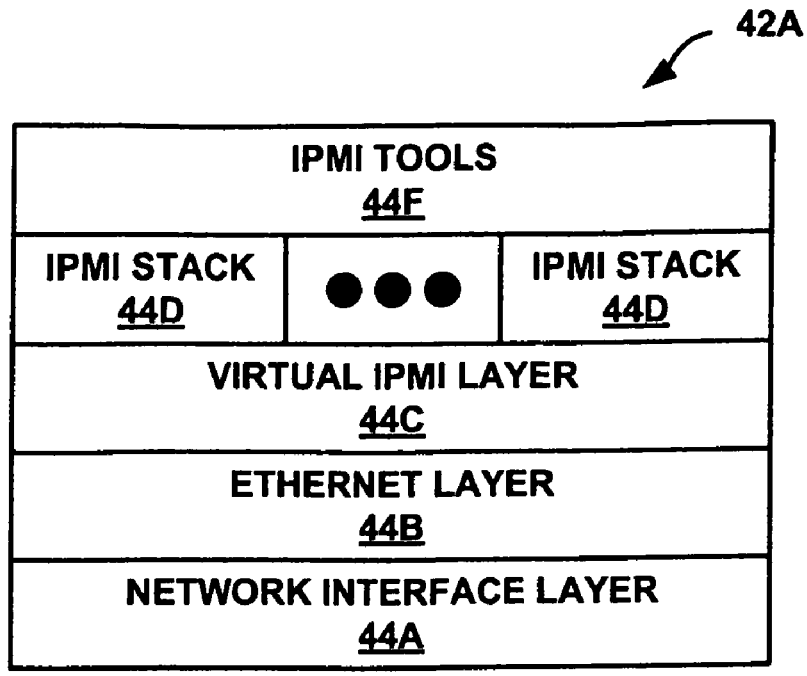
FIGS. 3A, 3B are diagrams illustrating respective exemplary logical views of implementations of the virtual IPMI protocol techniques described herein.
Figure 3B:
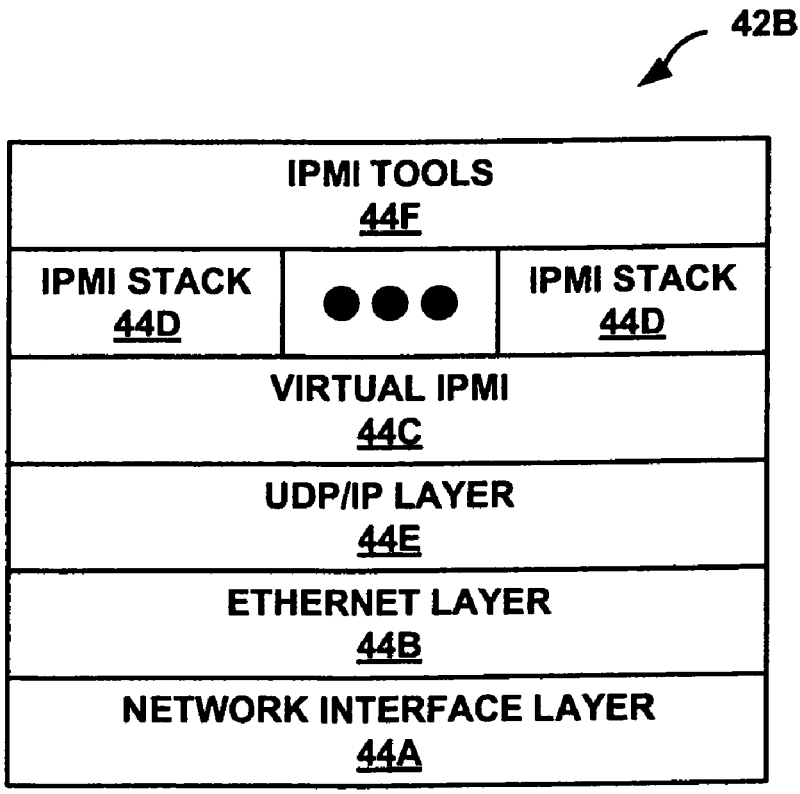

FIGS. 3A, 3B are diagrams illustrating respective exemplary logical views 42A, 42B of implementations of the virtual IPMI protocol techniques described herein. View 42A depicts a first exemplary implementation of a network stack for embodiments in which an IPMI message is directly encapsulated within an Ethernet message. View 42B depicts a second exemplary implementation of the network stack for embodiments in which an IPMI message is encapsulated within an UDP/IP message. Each of logical views 42A, 42B ("logical views 42") depicts various layers that correspond loosely to those found in the open systems interconnect basic reference model commonly referred to as the "OSI model" for short. The lower layers depicted at the bottom of each of logical views 42 generally represent physical layers while higher layers depicted at the top of each of logical views 42 generally represent data layers. Thus, the higher layers typically deal with the more abstract notion of handling data while those at the bottom are less abstract and deal more with the physical world, e.g., how to manage the interconnection of devices.

As shown in FIG. 3A, logical view 42A comprises a network interface layer 44A at the bottom, an Ethernet layer 44B above layer 44A, a virtual IPMI layer 44C above layer 44B, a plurality of IPMI stacks 44D ("IPMI stacks 44") residing above layer 44C, and, at the top, IPMI tools 44F. Network interface layer 44A represents that network interfaces 26 of FIG. 2, for example, form the actual interconnect by which communications are physically conveyed. Ethernet layer 44B demonstrates that the Ethernet protocol provides the protocol by which data is conveyed across network interfaces 26. Ethernet layer 44B resides on top of network interface layer 44A because Ethernet layer 44B handles the communication of data between network interfaces. Virtual IPMI layer 44C either maintains the mapping between IPMI addresses and an Ethernet or MAC addresses or makes an ARP request to determine which IPMB address associates with which Ethernet or MAC address, as described above. Because virtual IPMI layer 44C controls the requests and implements the necessary operations to permit IPMI messages to be transmitted across an Ethernet interconnect in accordance with the Ethernet protocol of Ethernet layer 44B, virtual IPMI layer 44C resides above Ethernet layer 44B. Virtual IPMI layer 44C resides below IPMI stacks 44D because virtual IPMI layer 44C is responsible for routing IPMI messages to the appropriate one of IPMI stacks 44D. Virtual IPMI layer 44C may determine which of stacks 44D should process a given IPMI message based on various identifiers contained in the given IPMI message.

IPMI stacks 44D reside on top of virtual IPMI layer 44D because IPMI stacks 44D process the IPMI messages unpackaged from the lower Ethernet and virtual IPMI layers to yield IPMI data. Each of the plurality of IPMI stacks 44D may associate with a different IPMI session, a different logical IPMB, or both. That is, one of IPMI stacks 44D may service all IPMI messages for a plurality of IPMI sessions occurring over one logical IPMB. Another one of IPMI stacks 44D may service IPMI messages for a single session over another logical IPMB. Still another one of IPMB stacks 44D may service IPMI messages associated with a single session regardless of what logical IPBM that session occurs over. In any event, a plurality of IPMI stacks 44D may exist contrary to the single IPMI stack 40D shown in FIG. 2. IPMI tools 44F reside at the top of logical view 42A and process, display, gather, and otherwise manage IPMI data received from the plurality of IPMI stacks 44D. IPMI tools 44F, as described above, may present this data to an administrator to enable the administrator to effectively administer mainframe computing system 12.

Accordingly, traversing logical view 42A from bottom to top generally describes the path through which an Ethernet message that directly encapsulates an IPMI message in accordance with the virtual IPMI protocol may be decoded by a receiving cell 14, as described above in detail. Traversing logical view 42A in reverse, from top to bottom, alternatively describes the path through which an IPMI message is directly encapsulated in an Ethernet message in accordance with the virtual IPMI protocol, as also described above in detail.

Logical view 42B shown in FIG. 3B is substantially similar to logical view 42A in that both logical views 42 comprise an network interface layer 44A, an Ethernet layer 44B, a virtual IPMI layer 44C, a plurality of IPMI stacks 44D, and IPMI tools 44F. However, logical view 42B further includes a UDP/IP layer 44E which resides above Ethernet layer 44B but below virtual IPMI layer 44C and represents the layer responsible for encapsulating the IPMI message within an UDP/IP message. Further differences also exist in virtual IPMI layer 44C. As described above, in this implementation whereby a UDP/IP message encapsulates an IPMI message, virtual IPMI layer 44C handles a static pre-programmed mapping between UDP endpoint and IPMI addresses instead of handling, as in the direct encapsulation implementation above, the discovery of an association between IPMI addresses and MAC addresses. Thus, because virtual IPMI layer 44C handles this mapping and causes the IPMI message to be encapsulated within an UDP/IP message, virtual IPMI layer 44C resides above UDP/IP layer 44E. Ethernet layer 44B, in this implementation, continues to provide certain Ethernet protocol functions for transmitting data across Ethernet interconnect 27.

Accordingly, traversing logical view 42B from bottom to top generally describes the path through which an UDP/IP message that encapsulates an IPMI message in accordance with the virtual IPMI protocol may be decoded by a receiving cell 14, as described above. Traversing logical view 42B in reverse from top to bottom alternatively describes the path through which an IPMI message is encapsulated in an UDP/IP message in accordance with the virtual IPMI protocol, as also described above.

Figure 4:
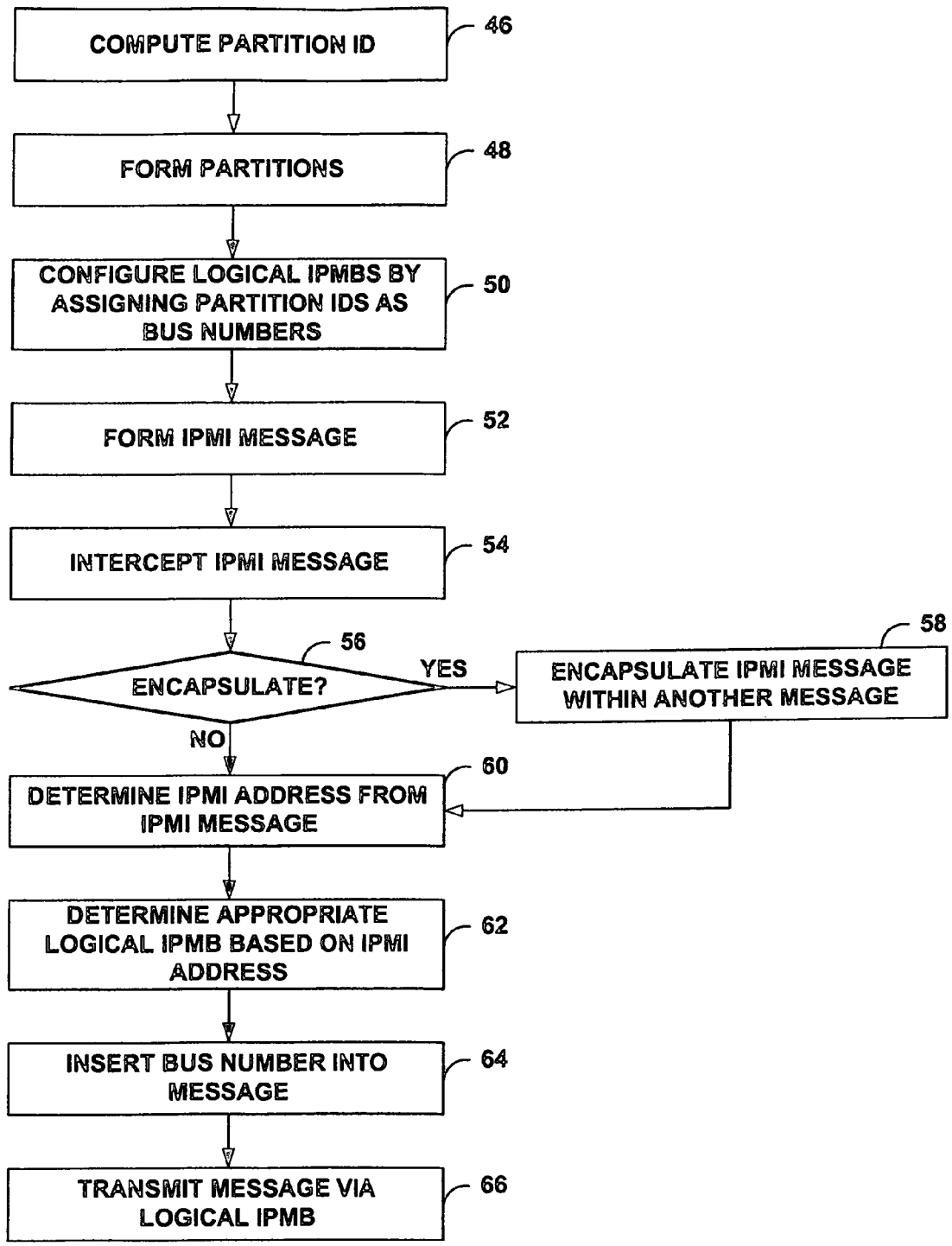
FIG. 4 is a flowchart illustrating exemplary operation of a cell in configuring a logical IPMB in accordance with the virtual IPMI protocol techniques described herein.

FIG. 4 is a flowchart illustrating exemplary operation of a cell, such as cell 14A of FIG. 2, in configuring a logical IPMB in accordance with the virtual IPMI protocol techniques described herein. Initially, cell 14A and, more particularly, maintenance software 38A may compute partition ID 32A based on cell ID 30A and possibly other administrator-supplied information (46). Based at least in part on partition IDs 32, cell 144A may form a partition, such as partition 34, with another cell, such as cell 14B, in the decentralized manner, such as that described in above incorporated reference titled "Decentralized Hardware Partitioning within a Multiprocessing Computing System" (48).

After the partitions have been established, maintenance software 38A may configure at least one logical IPMB for use in intra-partition communications by assigning partition ID 32A as the bus number for the logical IPMB and constructing the appropriate network stack(s), as described above (50). In particular, virtual IPMI 40C of maintenance software 38A may maintain the association between the logical IPMB bus number and partition ID 32A. Although described as occurring after formation of the partitions, maintenance software 38A may configure the logical IPMB concurrently with forming the partitions, prior to forming the partition, or, as described herein, after forming the partitions. Thus, the virtual IPMI protocol techniques should not be limited to the disclosed order described in reference to FIG. 4.

Once logical IPMBs are configured, maintenance software 38A may require IPMI 40D to form an IPMI message so that it can communicate with, for example, cell 14B (52). For example, an administrator may interact with IPMI tools 40F to request that maintenance software 38A form an IPMI message to gather specific IPMI data. Virtual IPMI 40C may intercept the IPMI message prior to forwarding the IPMI message to cell 14B without IPMI 40D realizing that another layer exists between it and transmission across a supposed $I^2C$ (54). In this manner, virtual IPMI 40C may leverage existing IPMI protocol capabilities, e.g., IPMI 40D, within maintenance software 38A.

To leverage these existing IPMI protocol capabilities, virtual IPMI 40C requires that the IPMI message be encapsulated within another protocol message since mainframe computing system 12 does not provide a dedicated $I^2C$ bus to interconnect cells 14 (56). Thus, virtual IPMB 40C may encapsulate the IPMI message within another message, as described above (58). However, for purposes of configuring logical IPMBs, encapsulating the IPMI message is not necessary. Thus, regardless of whether encapsulation has occurred, virtual IPMI 40C determines the IPMB address to which the IPMI message is addressed from the IPMI message (60). Based on this IPMI address, virtual IPMI 40C, using its association table, determines the appropriate logical IPMB based on the IPMB address and inserts the bus number, e.g., partition ID 32A, into either the IPMI message or the message that encapsulates the IPMI message (62, 64). Virtual IPMI 40C forwards the IPMI message, either by itself or encapsulated, to network interface 26A, whereupon network interface 26A transmits the message via the logical IPMB that resides on Ethernet interconnect 27, for example.

Figure 5:
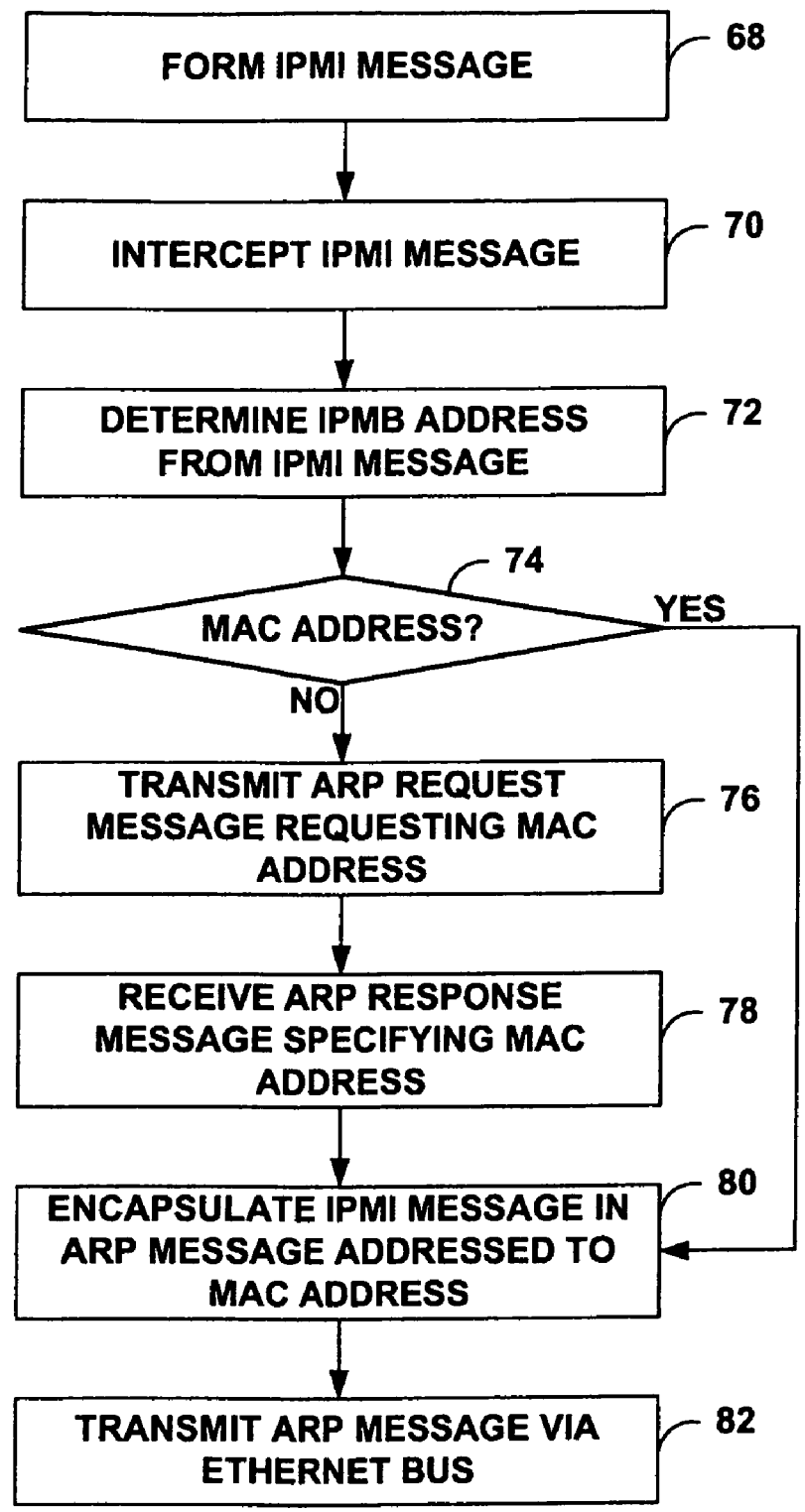
FIG. 5 is a flowchart illustrating exemplary operation of a cell in communicating in accordance with the virtual IPMI protocol techniques described herein.

FIG. 5 is a flowchart illustrating exemplary operation of a cell, such as cell 14A of FIG. 2, in communicating in accordance with the virtual IPMI protocol techniques described herein. More specifically, the flowchart illustrates exemplary operation of cell 14A in implementing an example embodiment of the techniques whereby virtual IPMI 40C of cells 14A causes Ethernet 40F to directly encapsulate the IPMI message within an Ethernet message, as described above.

Initially, as described above, IPMI 40D may form an IPMI message, such as may be required in response to an administrator issuing a command via user interface presented by IPMI tools 40F (68). Once formed, virtual IPMI 40C may intercept the IPMI message, again as described above (70). Virtual IPMI 40C next determines the IPMB address to which the IPMI message is addressed from the IPMI message, and may either consult a data structure that maintains associations between IPMI addresses and MAC addresses 41 or employ ARP 40A to determine such an association (72, 74). If a data structure is maintained, virtual IPMI 40C may not, as of yet, established an association between the particular IPMB address to which the IPMI message is addressed, and in any event, may employ ARP 40A to request the association. Thus, requesting an association via ARP 40A is discussed below for purposes of illustration, although it may not be strictly necessary to the virtual IPMI protocol techniques described herein.

In the event that either no MAC address is associated with the determined IPMB address within the data structure or no such data structure exists, maintenance software 38A may utilize ARP 40A to transmit an ARP request message that requests a response from whichever of cells 14 supports the virtual IPMI protocol and is identified by the determined IPMB address, as described above (76). ARP 40A may receive an ARP response message, as described above, from whichever of cells 14 identified by the determined IPMB address specifying a MAC address, such as MAC address 41B, assigned to network interface 26 of that cell 14 (78). Virtual IPMI 40C may either receive this MAC address 41 and establish an association within a data structure or, if no data structure is maintained, request that Ethernet 40E form an Ethernet message to directly encapsulate the IPMI message and which includes MAC address 41 as the destination address (80). If an association previously existed between the MAC address and IPMI message ("YES" 74), virtual IPMI 40C may cause Ethernet 40E to proceed with directly encapsulating the message without requiring ARP 40A to request the appropriate MAC address. In any event, virtual IPMI 40C may transmit the Ethernet message via Ethernet interconnect 27 by forwarding the Ethernet message to network interface 26A (82).

Figure 6:
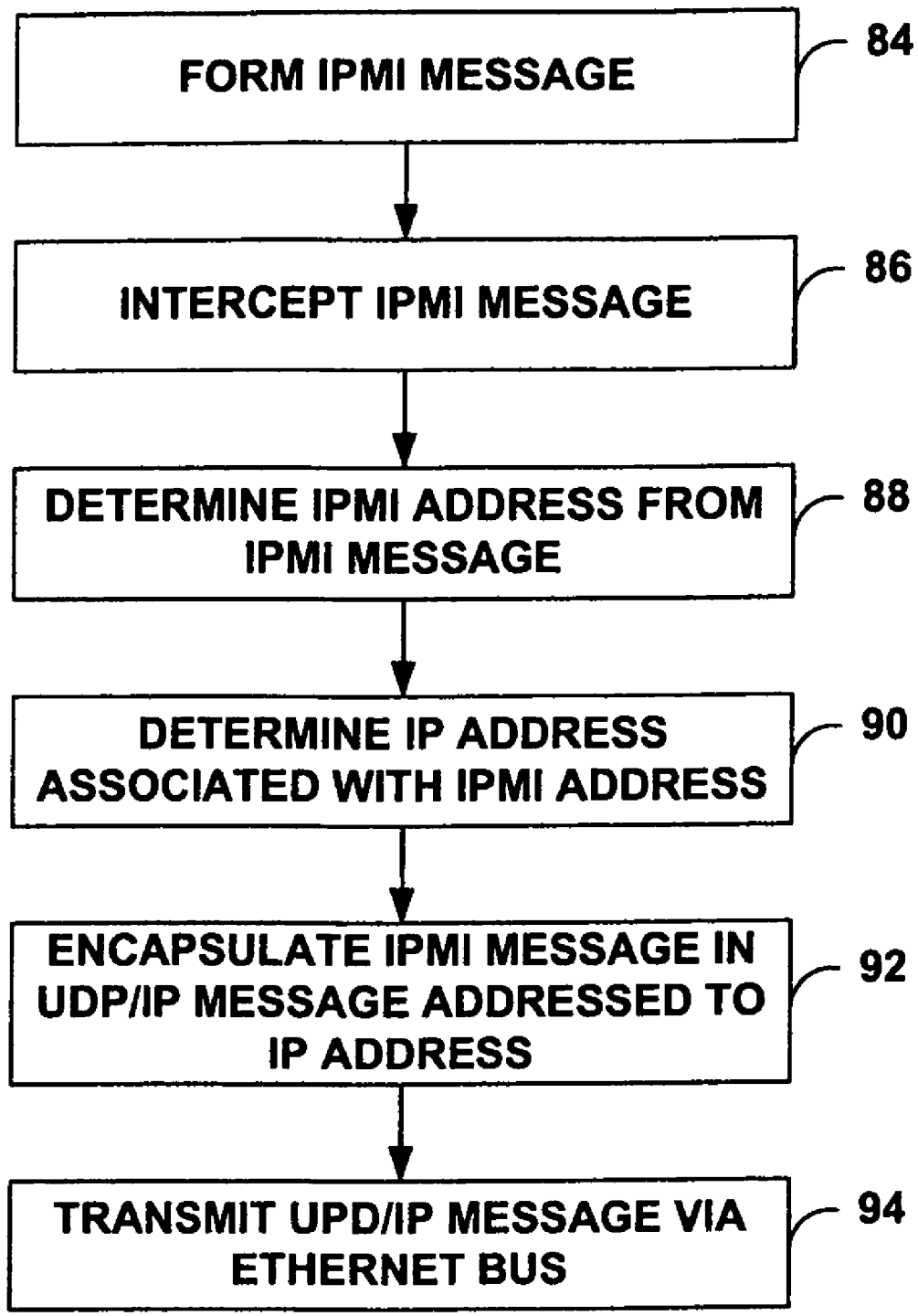
FIG. 6 is a flowchart illustrating exemplary operation of a cell in communicating in accordance with the virtual IPMI protocol techniques described herein.

FIG. 6 is a flowchart illustrating exemplary operation of a cell, such as cell 14A of FIG. 2, in communicating in accordance with the virtual IPMI protocol techniques described herein. More specifically, the flowchart illustrates exemplary operation of cell 14A in implementing an example embodiment of the techniques whereby virtual IPMI 40C of cells 14A causes UDP/IP 40B to encapsulate the IPMI message within a UDP/IP message, as described above.

Initially, as described above, IPMI 40D may form an IPMI message (84). Once formed, virtual IPMI 40C may intercept the IPMI message, again as described above (86). Virtual IPMI 40C next determines the IPMB address to which the IPMI message is addressed from the IPMI message, and determines an UDP endpoint associated with the determined IPMB address (88, 90). For example, virtual IPMI 40C may consult a lookup table or other data structure that maintains associations between IPMI addresses and UDP endpoint using the IPMB address as a key. Upon determining the associated UDP endpoint, virtual IPMI 40C may next request that UDP/IP 40B form a UDP/IP message to encapsulate the IPMI message and which includes as a destination address, the associated UDP endpoint (92). In any event, virtual IPMI 40C may transmit the UDP/IP message via Ethernet interconnect 27 by forwarding the UDP/IP message to network interface 26A (94).

Figure 7A:
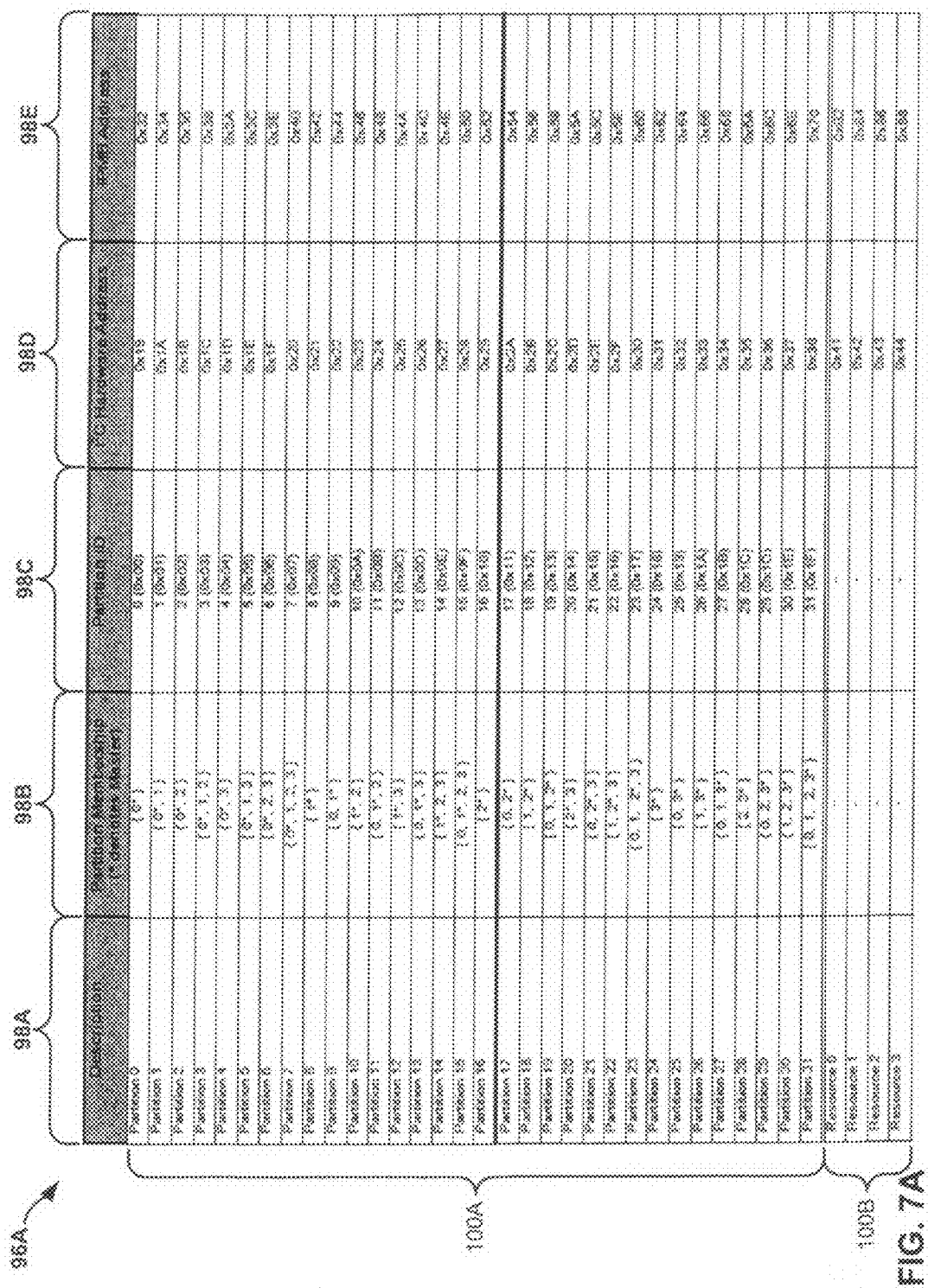
FIGS. 7A, 7B are diagrams illustrating respective exemplary views of a data structure used for storing associations between UDP endpoints and IPMI addresses in accordance with the principles of the invention.
Figure 7B:
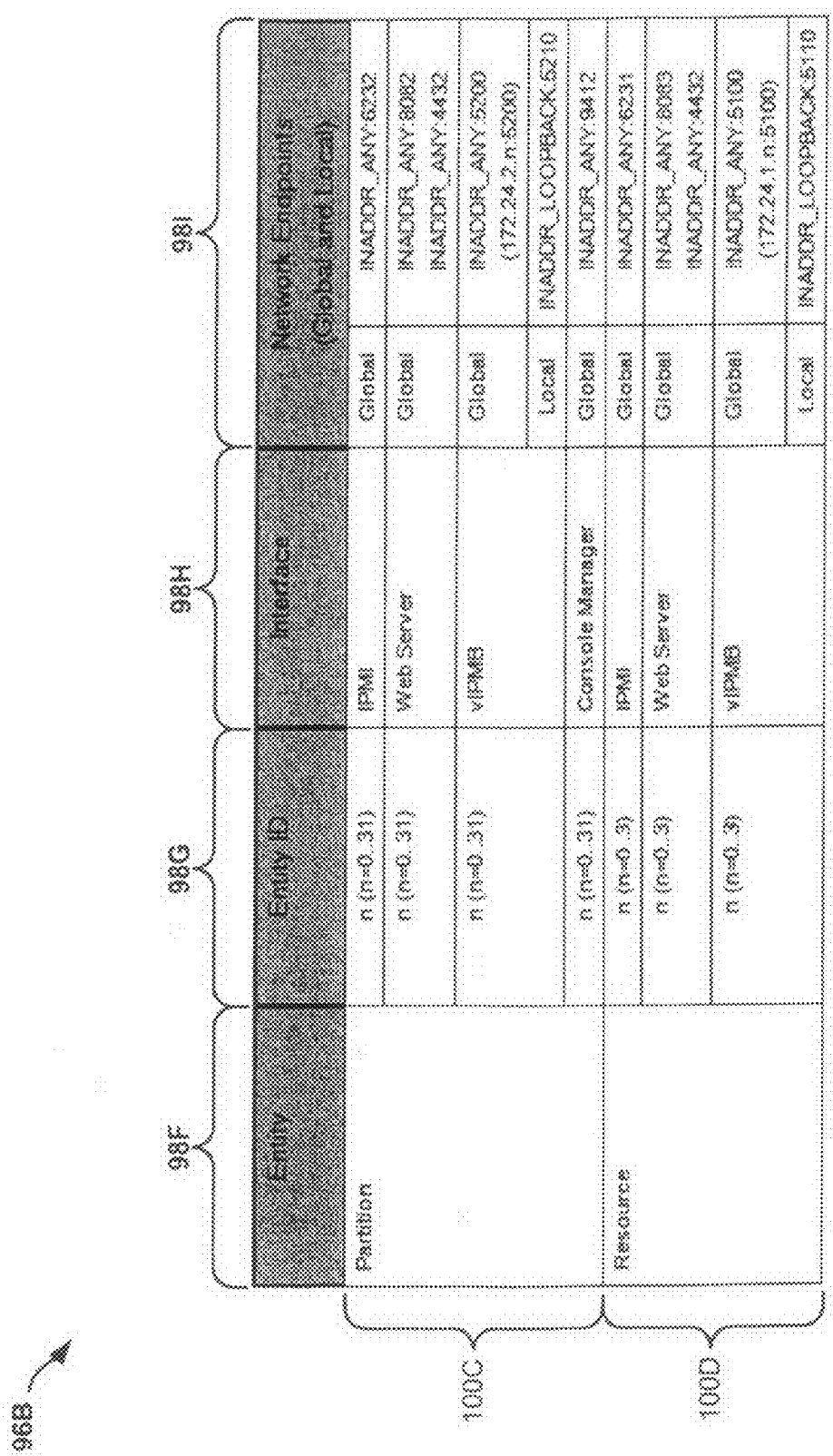

FIGS. 7A, 7B are diagrams illustrating respective exemplary views 96A, 96B of a data structure used for storing associations between UDP endpoints and IPMI addresses in accordance with the principles of the invention. View 96A comprises columns 98A-98E and rows 100A-100B, the combination of which define cells that each includes an association between partition IDs and IPMI addresses, as well as, other associations. View 96B comprises columns 98F-98I and rows 100C-100D, the combination of which define cells that each includes an association between partition IDs and UDP endpoints. Utilizing both of views 96A, 96B ("views 96"), a virtual IPMI module, such as virtual IPMI 40C of FIG. 2, may first determine a partition ID associated with a particular IPMB address via view 96A and second determine an UDP endpoint associated with the determined partition ID via view 96B. Although shown separately as two views 96, the data structure may comprise one or more objects for storing the associations, and views 96 are merely provided for illustration purposes.

As shown in FIG. 7A, description column 98A lists a text description for each row. Partition membership column 98B lists which cells (referred to as "resources" followed by a number from 0 to 3 in FIGS. 7A, 7B) belong to which partition, where a star denotes whether that cell is a master cell. The above incorporated co-pending application entitled "Decentralized Hardware Partitioning within a Multiprocessing Computing System," by named inventors J. Sievert et al., provides more information regarding partition formation and master cells. Partition ID column 98C lists a partition ID, such as one of partition IDs 32. $I^2C$ hardware Address column 98D lists an $I^2C$ hardware address associated with each of rows 100A, 100B. IPMB address column 98E lists an IPMB address assigned to each of rows 100A, 100B. Partition rows 100A list each partition, such as partition 34 of FIG. 2, that may exist within a mainframe computing system, such as system 12 of FIG. 1. Resources or, better stated, cell rows 100B lists each of cells 14 included within system 12. Thus, view 96A illustrates a system that may possibly form 32 partitions, e.g., partitions 0-31, and that currently comprises four cells, i.e., resources 0-3.

Selecting one of rows 100A and following it to column 98C allows virtual IPMI 40C to determine a partition ID. Following that row 100A to column 98E allows virtual IPMI 40C to associate an IPMB address to the determined partition ID, and vice versa. For example, for the one of rows 100A identified by a description of "Partition 10," virtual IPMI 40C may determine that partition ID equal to decimal "10" or hexadecimal "0x0A" is associated with an IPMB address of hexadecimal "0x46." Similarly, for each of rows 100B, virtual IPMI 40C may determine a similar association between its cell ID by looking to the description and noting which resource number belongs to which IPMB address. Alternatively, in other embodiments, a resource ID may be assigned to another column and the above process described with respect to partition ID column 98D may be carried out to determine an association between the resource or cell ID and the IPBM address.

As shown in FIG. 7B, entity column 98F lists for each of rows 100C, 100D whether the row refers either to a "partition" or a "resource." Entity ID column 98G lists an ID associated with the entity listed in entity column 98F. That is entity ID column 98G lists the partition IDs, such as partition IDs 32, and resource or cell IDs, such as cell IDs 30. Interface column 98H lists an interface associated with each partition and cell identified respectively by the partition IDs and cell IDs listed in entity ID column 98G. Network endpoints column 98I lists for each of rows 100C, 100D either a global UDP endpoint or a local UDP endpoint. Network endpoints column 98I lists these UDP endpoints in a variable name format, meaning that each of the variable names, such as "INADDR_LOOPBACK," indicates a particular UDP endpoint or range of UDP endpoints. The number following the variable name and separated by the variable name by a colon, e.g., the "5210" of "INADDR_LOOPBACK:5210," indicates the particular IP port.

Selecting one of row 100C and following it to column 98H allows virtual IPMI 40C to determine an interface. Particularly, virtual IPMI 40C can choose the IPMI interface for any of partition IDs n, where n=0 . . . 31, as shown in entity ID column 98G Following this row farther to the right to column 98I allows virtual IPMI 40C to determine that an UDP endpoint "INADDR_ANY:6232" is associated with the partition IDs equal to 0-31. Alternatively, if logical IPMB have been established, virtual IPMI 40C may determine separate UDP endpoints to use, which is shown as global UDP endpoint "INADDR_ANY:5200" and local UDP endpoint "INADDR_LOOPBACK:5210." Similarly, virtual IPMI 40C may determine associations between resource or cell IDs shown in entity ID column 98G and UDP endpoints stored to column 98I for rows 100D. Using the associations stored to both of views 96, virtual IPMI may determine an association so that the IPMI message can be correctly forwarded throughout system 12.

Figure 8:
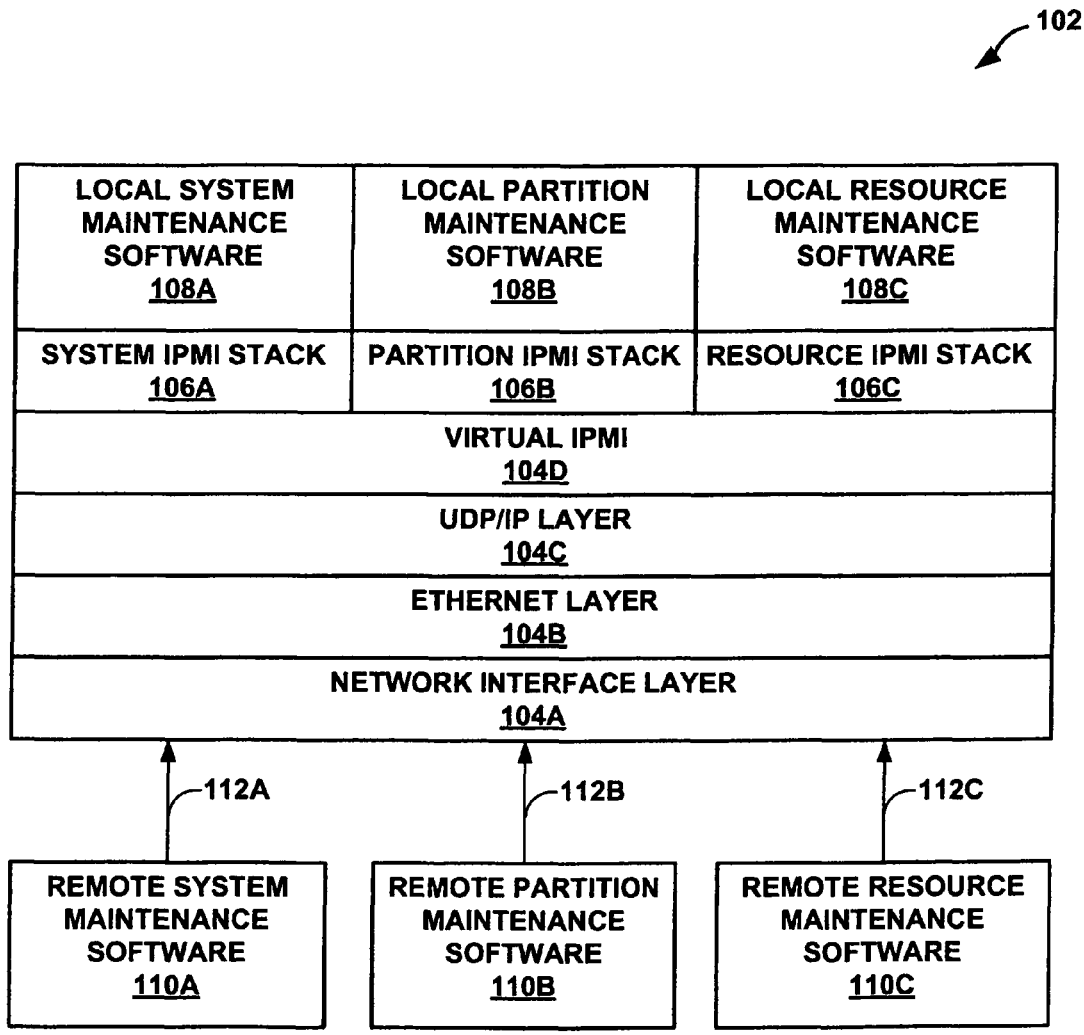
FIG. 8 is a diagram illustrating another exemplary logical view of an implementation of the virtual IPMI protocol techniques described herein.

FIG. 8 is a diagram illustrating another exemplary logical view 102 of an implementation of the virtual IPMI protocol techniques described herein. Similar to logical view 42B of FIG. 3B, logical view 102 includes a network interface layer 104A, an Ethernet layer 104B, a UDP/IP layer 104C, and a virtual IPMI layer 104D. Each of these layers 104A-104D are substantially similar to above described respective layers 44A, 44B, 44E, 44C. Moreover, although not included as a separate figure and explicitly described herein, logical view 102 may instead be substantially similar to logical view 42A in that it may not include UDP/IP layer 44E. That is, the techniques by which messages propagate up and down layers 104A-104D is not critical to the below operations, and layers 104A-104D are provided in logical view 102 merely for contextual purposes.

In the illustrated example implementation of FIG. 8, logical view 102 comprises three different IPMI stacks 106A-106C, each of which resides on top of virtual IPMI layer 104D. IPMI stacks 106A-106C each represent exemplary embodiments of IPMI stacks 44D as shown in either or both of FIG. 3A or 3B. Each of IPMI stacks 106A-106C executes locally within a cell, such as cell 14A of FIG. 2, on a maintenance processor, such as maintenance processor 24A. System IPMI stack 106A comprises an IPMI stack for servicing system-level IMPI messages. Partition IPMI stack 106B comprises an IPMI stack for servicing partition-level IPMI messages. Resource IPMI stack 106C comprises an IPMI stack for servicing resource- or better stated cell-level IPMI messages.

Logical view 102 further comprises three different application or software instances 108A-108C, each of which resides on top of and receives and responds to IPMI messages originating from respective stacks 106A-106C. Software instances 108A-108C represent an exemplary embodiment of IPMI tools 44F of either or both of FIG. 3A or 3B. Each of software instances 108A-108C also executes locally within a single cell, such as cell 14A, on a maintenance processor, such as maintenance processor 24A. Local system maintenance software 108A may comprise a tool for configuring and monitoring the system as a whole. Local partition maintenance software 108B may comprise a tool for configuring and monitoring individual partitions. Local resource maintenance software 108C may comprise a tool for configuring and monitoring resources or, better stated, cells.

Logical view 102 also comprises three different remote application or software instances 110A-110C, each of which transmit IPMI messages 112A-112C encapsulated, in this instance, within UDP/IP messages. Software instances 110A-110C each comprises software executing remotely from the cell within which respective software instances 108A-108C execute. Although not shown in FIG. 8 for ease of illustration purposes, software instances 110A-110C may also sit on top of similar layers 104A-104D and stacks 106A-106C and may generate IPMI messages 112A-112C by passing these messages down these similar stacks and layers.

Typically, remote software instances 110A-110C each transmit respective IPMI messages 112A-112C via a different virtual IPMB. That is, remote system maintenance software 110A transmit IPMI messages 112A via a first virtual IPMB, remote partition maintenance software 110B transmits IPMI messages 112B via a second virtual IPMB, and remote resources maintenance software 110C transmits IPMI messages 112C via a third virtual IPMB. Virtual IPMI layer 104D, in this instance, uses the virtual IPMB to forward IPMI messages 112A-112C to the correct one of stack 106A-106C and software instances 108A-108C. In other words, virtual IPMI 104D, for example, receives IPMI messages 112A via the first virtual IPMB, and based on this virtual IPMB number, forwards IPMI messages 112A to system IPMI stack 106A. In this manner, virtual IPMI 104D implements what are known as "channels" within the context of the IPMI protocol.

As described below in further detail, channels in the IPMI protocol can be associated with a user or group of users, thereby giving an individual user control over all resources or cells that fall within one or more channels to which the user has been given access. The user generally provides authentication information before the system yields to the control of the user, and therefore, channels provided an additional layer of security. Virtual IPMI layer 104D enables the concept of IMPI channels by providing separate and distinct virtual IPMBs over which authorized traffic can flow. Software instances 108A-108C and 110A-110C may continue to associate users with a given channel, whereupon virtual IPMB layer 104C maps each channel to different virtual IPMB. The transparent mapping of channels to virtual IPMBs allows software instances 108A-108C and 110A-110C to continue to provide the security features by way of channel specific user authentication.

Figure 9:
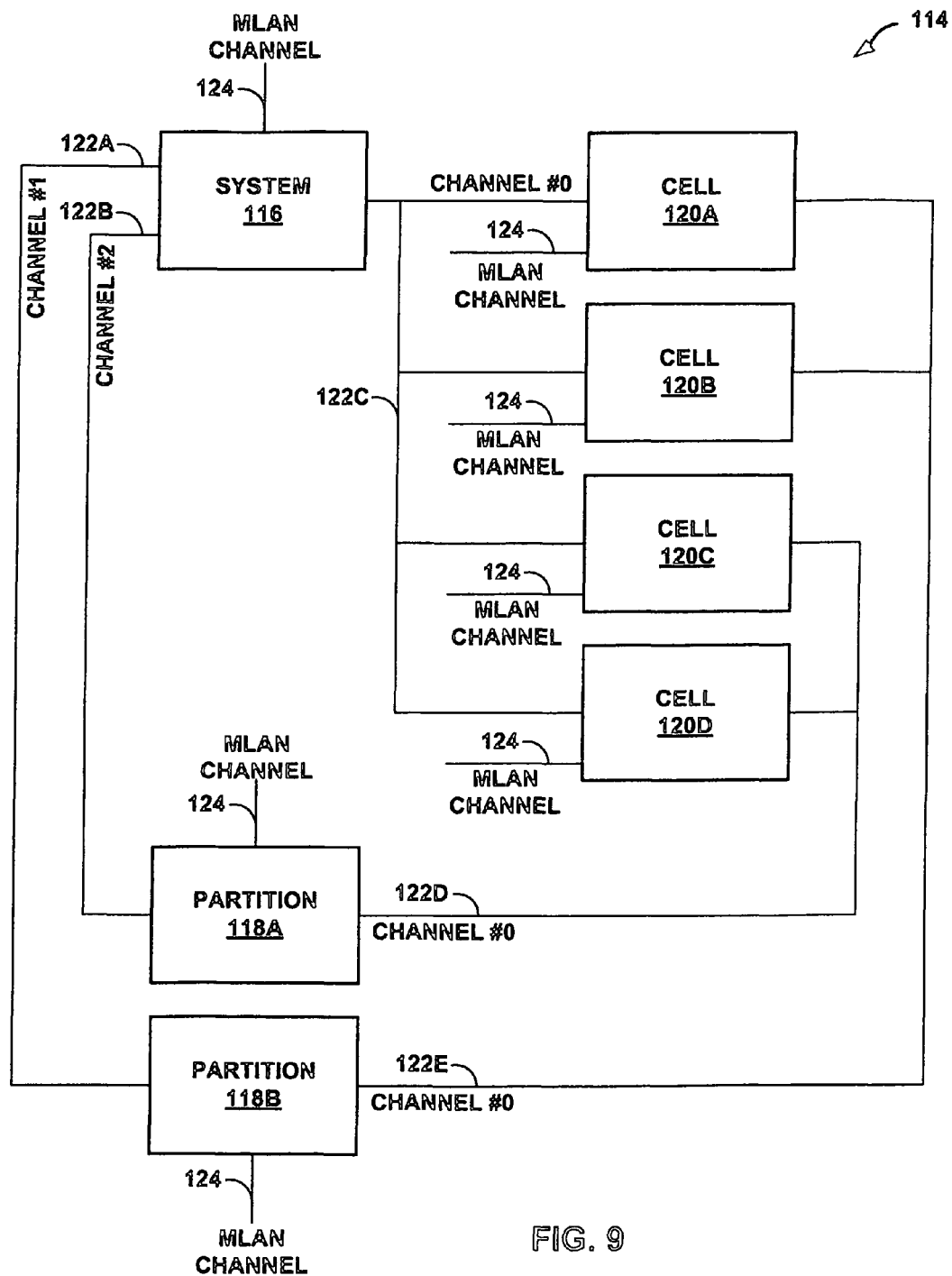
FIG. 9 is a diagram illustrating a conceptual view of a mainframe computing system that implements the techniques in accordance with the principles of the invention.

FIG. 9 is a diagram illustrating a conceptual view of a mainframe computing system 114 that implements the techniques in accordance with the principles of the invention. In particular, mainframe computing system 114 includes a system 116, partitions 118A and 188B ("partitions 118"), and cells 120A-120D ("cells 120"). Each of system 116, partitions 118, and cells 120 represent IPMI stacks. That is, system 116 represents a system stack similar to system IPMI stack 106A of FIG. 8, partitions 118 each represents a partition stack similar to partition IPMI stack 106B, and cells 120 each represents a resource stack similar to resource IPMI stack 106C. The conceptual view of mainframe computing system 114 therefore depicts, as an exemplary embodiment, the interaction between system IPMI stack 106A, partition IPMI stack 106B, and resource IPMI stack 106C within each cell.

It is assumed that each cell, such as each of cells 14A-14N of FIG. 1, execute three IPMI stacks similar to IPMI stacks 106A-106C. Cells 14A communicate with one another to elect a master system stack 106A from system stacks 106A executing within each of cells 14. Cells 14 also communicate with each other to elect a master partition stack 106B for each partition. Those stacks 106A, 106B not elected master execute within respective cells 14 but do not receive or respond to any IPMI messages. In effect these stacks 106A, 106B are inactive or "turned off." Those stacks 106A, 106B elected as master are designated as system 116 and partitions 118 in FIG. 9. Because stacks 106C executes within cells 14 and none are elected master, stacks 106C are designated as cells 120A-120D. Although only four cells are shown in FIG. 9, the techniques apply to any number of cells 120.

As shown in FIG. 9, system 116 couples to each of partitions 118 via respective channels or virtual IPMBs 122A, 122B denoted as "channel #1" and "channel #2" in FIG. 9. System 116 also couples to each of cells 120 via channel or virtual IPMB 122C denoted as "channel #0" in FIG. 9. Partitions 118A couples to each of cells 120C, 120D via virtual IPMB 122D denoted as "channel #0" in FIG. 9. Partition 118B couples to each of cells 120A, 120B via virtual IPMB 122E also denoted as "channel #0" in FIG. 9. Each of system 114, partitions 118, and cells 120 also comprises an "MLAN channel" or interfaces 124 by which each respective IPMI tool receives messages from the respective stacks 116, 118, and 120. For example, system 116 via its interface 124 forwards IPMI messages received via virtual IPMB 122A to local system maintenance software, such as local system maintenance software 108A. The view of mainframe computing system 114 is "conceptual" in that physically only a single Ethernet interconnect 27 couples each of the cell 14, but conceptually each virtual IPMI 122A-122E can be viewed as a separate channel or logical interconnect.

In this manner, each of software instances 108A-108C may associate a number of users with a particular "channel" or virtual IPMB 122A-122E. System software 108A may for example associate a first system-level administrative set of users with all three or only a subset of virtual IPBMs 122A-122C. Partition software 108B coupled to partition 118A via its interface 124 may associate a second partition-level set of users with virtual IPMB 122D. Partition software 108C coupled to partition 118B via its interface 124 may associate a third partition-level set of users with virtual IPMB 122E. A user may, in order to gain control of each level of mainframe computing system 114, be required to provide authenticating information at each level.

For example, a user may be required to log into system software 108A, whereupon system software 108A verifying the information provided by the user and determines the extent of control to allow the user over partitions 118 and cells 120. Assuming the user has proper authentication to access virtual IPMB 122B only, the user may access partition 118A, whereupon partition software 108B may require the user to again log in. Partition software 108B verifies the user provided information before allowing access to cells 120C, 120D. Again, assuming proper authentication, the user may manage partition 118A and cells 120C, 120D. The user may issue IPMI messages via interactions with partition software 108A coupled to partition 118A via interface 124. The IPMI message flow down logical view 102 to partition IPMI stack 106B, i.e., partition 118A, to virtual IPMI 104D, which forwards the IPMI message to one or more of resource IPMI stacks 106C, e.g., in this instance to cells 120C, 120D. Local resource maintenance software 108C coupled to each of these cells 120C, 120D via interface 124 respond to the IPMI messages where these messages traverse up logical view 102. In this manner, virtual IPMBs 122A-122E assume the same role as channels in the IPMI context and thereby facilitate additional security features by enabling users to be associated with different channels or virtual IPMBs.

Various embodiments of the invention have been described. These and other embodiments are within the scope of the following claims.

The invention claimed is:

1. A method of communicating intelligent platform management interface data within a mainframe computing system, the method comprising:

forming a plurality of partitions within the mainframe computing system, wherein each partition is a logical association of one or more of a plurality of independent computing cells of the mainframe computing system communicatively coupled together by a network interconnect to define a single execution environment that includes the one or more logically associated cells;

determining within each one of the plurality of partitions an associated partition identifier that uniquely identifies each of the plurality of partitions within the mainframe computing system;

executing a virtual intelligent platform management interface (IPMI) protocol to define and configure a respective logical intelligent platform management bus (IPMB) for each of the partitions, each of the IPMBs to logically interconnect each of the one or more plurality of cells included within the same one of the plurality of partitions, wherein configuring the logical IPMB within each of the plurality of partitions comprises assigning each of the logical IPMBs an associated bus number equal to the partition identifier associated with the partition in which the logical IPMB resides, wherein the bus number uniquely identifies each of the logical IPMBs within the mainframe computing system, and wherein each of the logical IPMBs are defined for communication of IPMB messages over the network interconnect; and securely communicating the IPMI messages between each of the one or more cells of each partition via the respective logical IPMB of each partition.

2. The method of claim 1, wherein securely communicating the IPMI messages between each of the one or more cells of each partition comprises forming an IPMI message addressed to an IPMB address in accordance with an IPMI protocol with an IPMI stack executing within one of the plurality of cells.

3. The method of claim 2, wherein the IPMI stack comprises one of a system IPMI stack, a partition IPMI stack, and a resource IPMI stack.

4. The method of claim 3, wherein securely communicating the IPMI messages further comprises:

securely communicating IPMI messages formed in accordance with the system IPMI stack via a first logical IPMB; and securely communicating IPMI messages formed in accordance with the partition IPMI stack via a second logical IPMB.

5. The method of claim 4, further comprising:

associating, with a system management software tool, a first set of users with the first logical IPMB;

associating, with a partition management software tool, a second set of users with the second logical IPMB; and authenticating, with one or more of the system management software tool and the partition management software tool, a user as included within one or more of the first and second sets of users before allowing the user to initiate the secure communication of IPMI messages via the respective first logical IPMB, second logical IPMB, or both.

6. The method of claim 1, wherein securely communicating the IPMI messages between each of the one or more cells of each partition further comprises:

accessing a mapping that stores associations between a bus number assigned to each logical IPMB of each of the partitions, an IPMB address assigned to each of the cells, and a media access control (MAC) address assigned to an Ethernet interface of each of the cells to determine an appropriate MAC address and bus number based on a given IPMB address;

encapsulating each of the IPMI messages directly within an Ethernet message that includes the appropriate MAC address and bus number; and securely communicating the Ethernet messages via the logical IPMB associated with the bus number included within each of the Ethernet messages.

7. The method of claim 6, further comprising determining an association stored to the mapping by:

transmitting a message with one of the cells requesting a response from the IPMB address assigned to one of the other cells;

receiving a response message from the IPMB address assigned to the other cell that indicates the MAC address assigned to an Ethernet interface of the other cell; and determining a mapping between the MAC address assigned to the Ethernet interface of the other cell and the IPMB address assigned to the other cell.

8. The method of claim 7, wherein securely communicating the IPMI messages between each of the one or more cells of each partition further comprises:

accessing a mapping that stores associations between a bus number assigned to each logical IPMB of each of the partitions, an IPMB address assigned to each of the cells, and an user datagram protocol (UDP) endpoint assigned to an interface of each of the cells to determine an appropriate UDP endpoint and bus number based on a given IPMB address;

encapsulating each of the IPMI messages within an universal datagram protocol/internet protocol (UDP/IP) message that includes the appropriate UDP endpoint and bus number; and securely communicating the UDP/IP messages via the logical IPMB associated with the bus number included within each of the UDP/IP messages.

9. A mainframe computing system that communicates intelligent platform management interface (IPMI) data, the system comprising:

a network interconnect; and a plurality of independent computing cells communicatively coupled together by the network interconnect, and that form a plurality of partitions, wherein each partition is a logical association of one or more of the plurality of cells to define a single execution environment that includes the one or more logically associated cells, wherein an associated partition identifier that uniquely identifies each of the plurality of partitions within the mainframe computing system is determined within each one of the plurality of partitions, wherein each cell executes a virtual intelligent platform management interface (IPMI) protocol to define and configure a respective logical intelligent platform management bus (IPMB) for each of the partitions, assigning each of the logical IPMBs an associated bus number equal to the partition identifier associated with the partition in which the logical IPMB resides, wherein the bus number uniquely identifies each of the logical IPMBs within the mainframe computing system and wherein each of the IPMBs to logically interconnect each of the one or more plurality of cells included within the same one of the plurality of partitions, each of the logical IPMBs defined for communication of IMPI messages over the network interconnect, and wherein the cells securely communicate the IPMI messages between each of the one or more other cells of each partition via the respective logical IPMB of each partition.

10. The system of claim 9, wherein the cells securely communicate the IPMI messages between each of the one or more cells of each partition by forming an IPMI message addressed to an IPMB address in accordance with an IPMI protocol with an IPMI stack executing within one of the plurality of cells.

11. The system of claim 10, wherein the IPMI stack comprises one of a system IPMI stack, a partition IPMI stack, and a resource IPMI stack.

12. The system of claim 11, wherein the cells securely communicate the IPMI messages by:

securely communicating IPMI messages formed in accordance with the system IPMI stack via a first logical IPMB; and securely communicating IPMI messages formed in accordance with the partition IPMI stack via a second logical IPMB.

13. The system of claim 12, wherein each cell executes a system management software tool and a partition management software tool, the system management software tool associates a first set of users with the first logical IPMB, the partition management software tool associates a second set of users with the second logical IPMB, and one or more of the system management software tool and the partition management software tool authenticate a user as included within one or more of the first and second sets of users before allowing the user to initiate the secure communication of IPMI messages via one or more of the respective first logical IPMB and second logical IPMB.

14. The system of claim 9, wherein the cells further securely communicate the IPMI messages between each of the one or more cells of each partition by:

accessing a mapping within each of the cells that stores associations between a bus number assigned to each logical IPMB of each of the partitions, an IPMB address assigned to each of the cells, and a media access control (MAC) address assigned to an Ethernet interface included within each of the cells to determine an appropriate MAC address and bus number based on a given IPMB address;

encapsulating each of the IPMI messages directly within an Ethernet message that includes the appropriate MAC address and bus number; and securely communicating the Ethernet messages via the logical IPMB associated with the bus number included within each of the Ethernet messages.

15. The system of claim 14, wherein the cells further determine an association stored to the mapping by:

transmitting a message with one of the cells requesting a response from the IPMB address assigned to one of the other cells;

receiving a response message from the IPMB address assigned to the other cell that indicates the MAC address assigned to an Ethernet interface of the other cell; and determining a mapping between the MAC address assigned to the Ethernet interface of the other cell and the IPMB address assigned to the other cell.

16. The system of claim 9, wherein the cells further securely communicate the IPMI messages between each of the one or more cells of each partition by:

accessing a mapping that stores associations between a bus number assigned to each logical IPMB of each of the partitions, an IPMB address assigned to each of the cells, and an user datagram protocol (UDP) endpoint assigned to an interface of each of the cells to determine an appropriate UDP endpoint and bus number based on a given IPMB address;

encapsulating each of the IPMI messages within an universal datagram protocol/internet protocol (UDP/IP) message that includes the appropriate UDP endpoint and bus number; and securely communicating the UDP/IP messages via the logical IPMB associated with the bus number included within each of the UDP/IP messages.

* * * * *